July 15, 1958
H. E. SLOAN ET AL
2,843,389
CHUCK
Filed Oct. 28, 1954
7 Sheets-Sheet 1
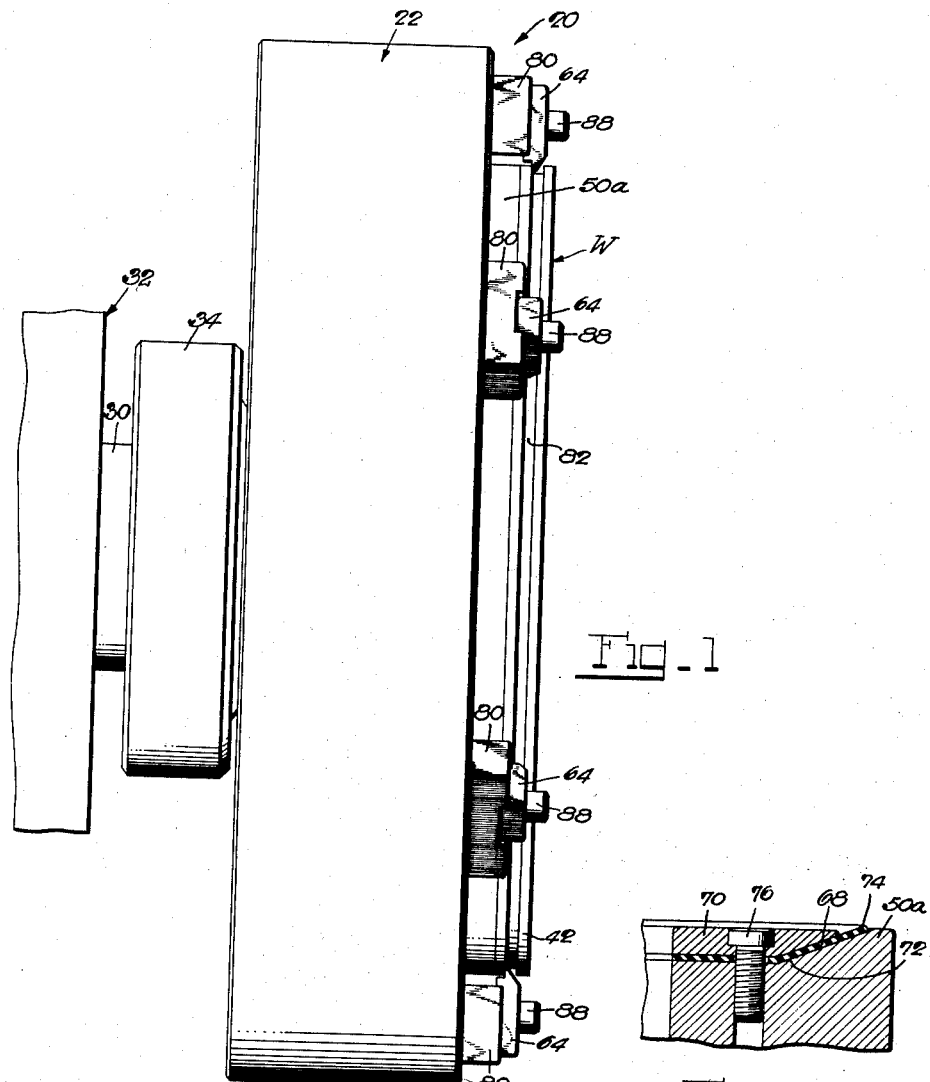
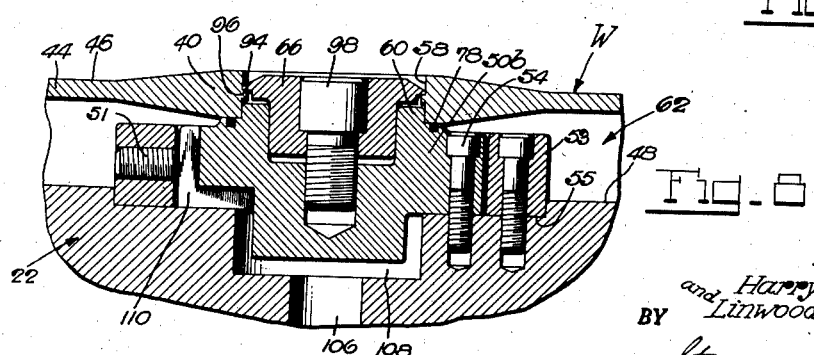
INVENTORS.
Harry E. Sloan
and Linwood B. Swanson
BY
Stewart & Sprung
Attorneys.

INVENTORS.
Harry E. Sloan
and Linwood B. Swanson
BY
Attorneys.

July 15, 1958     H. E. SLOAN ET AL     2,843,389
CHUCK
Filed Oct. 28, 1954     7 Sheets-Sheet 4
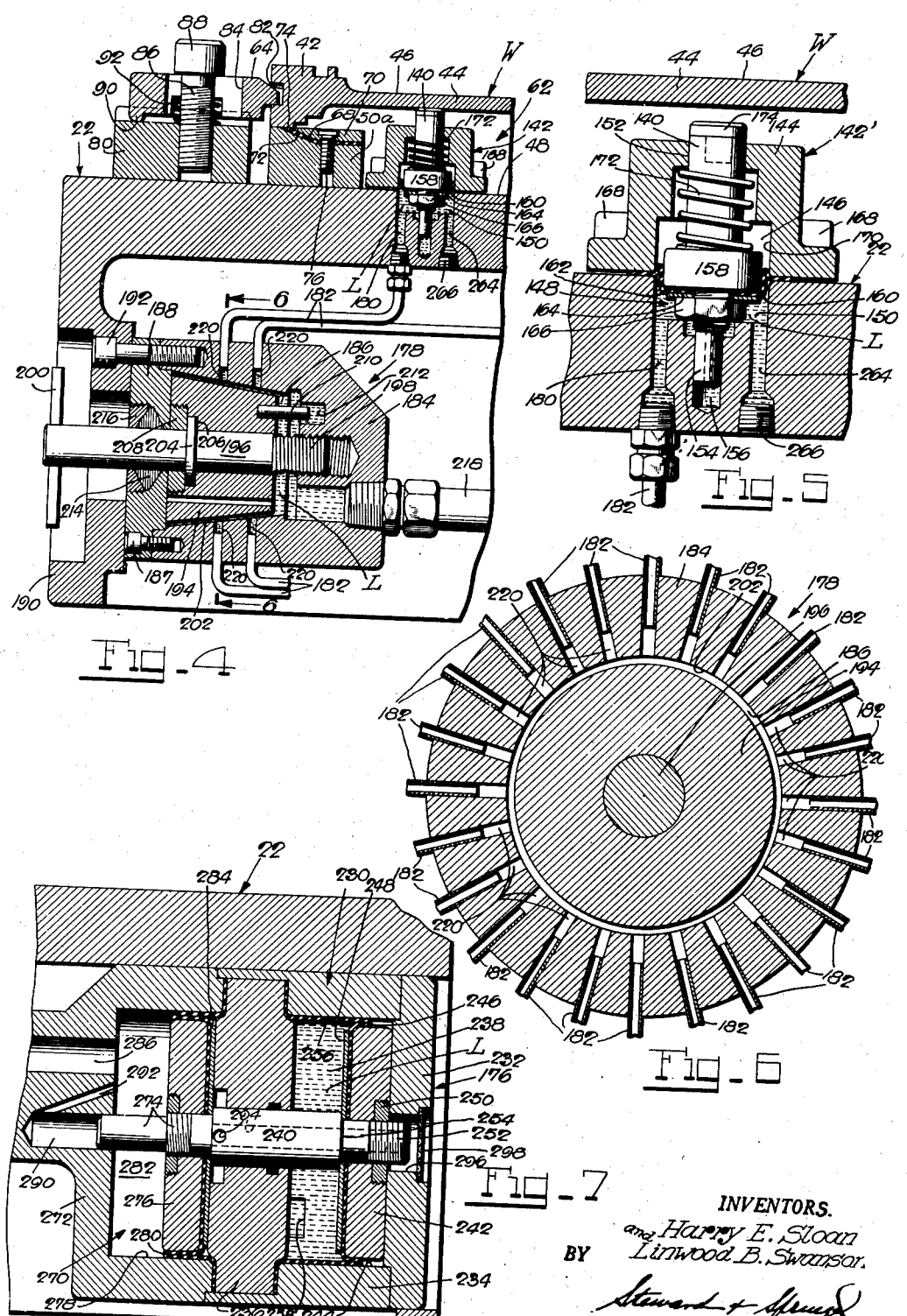
INVENTORS.
Harry E. Sloan
BY Linwood B. Swanson.
Attorneys.

July 15, 1958 H. E. SLOAN ET AL 2,843,389
CHUCK
Filed Oct. 28, 1954 7 Sheets-Sheet 5
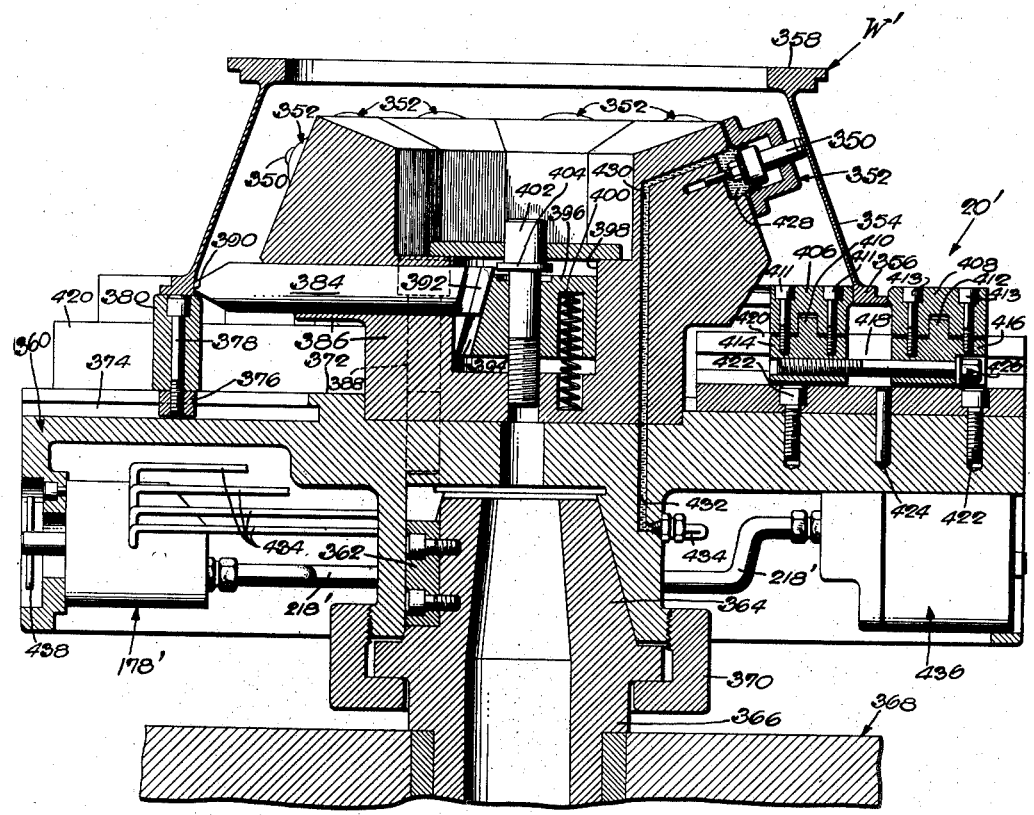
Fig_13
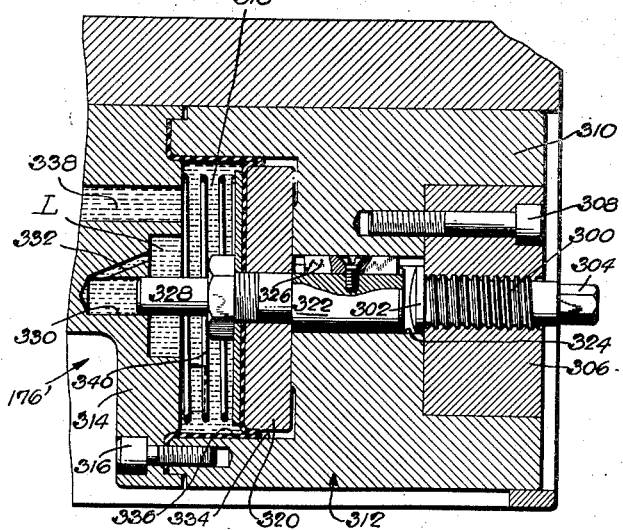
Fig_10
INVENTORS.
Harry E. Sloan
and Linwood B. Swanson
BY
Stewart & Spruegel
Attorneys.

July 15, 1958 H. E. SLOAN ET AL 2,843,389
CHUCK
Filed Oct. 28, 1954 7 Sheets-Sheet 6

INVENTORS.
Harry E. Sloan
BY Linwood B. Swanson

Stewart & Sprigg
Attorneys.

INVENTORS.
Harry E. Sloan
and Linwood B. Swanson
BY
Steward + Sprengel
Attorneys.

United States Patent Office 2,843,389
Patented July 15, 1958

2,843,389

CHUCK

Harry E. Sloan, Hartford, and Linwood B. Swanson, New Britain, Conn., assignors to The Cushman Chuck Company, Hartford, Conn., a corporation of Connecticut Application October 28, 1954, Serial No. 465,306

15 Claims. (Cl. 279—3)

This invention relates to chucks in general, and to chucks for holding distortable or fragile work in particular.

Conventional chucks of the jaw or collet types are in many instances wholly inadequate for holding, for accurate machining, work of various distorted or non-distorted shapes and of deformable or fragile nature, hereinafter collectively referred to as "special" work. Thus, many types of work in this special category may be naturally distorted, and would temporarily become even further distorted in part or in toto on being securely gripped by a conventional chuck or on being operated on with a machine tool, or both, with the result that the work would be spoiled completely and rendered useless for its intended purpose if it were actually subjected to a machining operation under these circumstances. Other types of work in this special category may be so fragile in part or in toto as to prohibit efficient machining of the same in a conventional chuck for fear of breaking the work.

An earlier solution to the problem of safely machining work of the aforementioned fragile nature was found in the provision on a chuck of mechanical jacks the rams of which are spring-urged against critical portions of the gripped work and then locked in position so as to afford additional rigid supports for the work when being operated on. While these prior jacks perform their designated function satisfactorily, they greatly limit the productivity of the chuck, for the requirement of locking each jack separately and subsequently unlocking the same unduly prolongs the task of placing work in the chuck and removing it therefrom. Further, these prior jacks offer no solution whatever to the problem of securely holding permanently distorted and further distortable work in temporarily non-distorted condition for its accurate machining, or securely holding distortable work against distortion when being operated on, or both.

It is the primary aim and object of the present invention to provide a chuck of a type which will securely hold permanently distorted and further distortable work in temporarily non-distorted condition for its accurate machining, or which will securely hold distortable work against distortion when subjected to a machining operation.

It is another object of the present invention to provide a chuck of this type the body of which has at its front spaced work rests or stops which hold work thereon spaced from the chuck body and which in number and location are so arranged as to compel properly located and fully engaging distortable work thereon to assume or remain in non-distorted condition when subjected to local tool or other pressure anywhere on its side opposite the rests, and to further provide at the front of the chuck body sealing means which will effectively seal the space, hereinafter sometimes referred to as "vacuum" space, between the located work on the rests and the chuck body from the atmosphere when engaged by this work, so that on subsequent exhaust of air from this sealed vacuum space the partial vacuum therein will uniformly draw the work against the rests and securely hold it in engagement therewith.

It is a further object of the present invention to provide a chuck of this type of which only a part of the aforementioned work rests, sufficient in number and suitable in location to compel distortable work thereon to assume or remain in non-distorted condition in the absence of external tool pressure thereon, are fixed in position, while the remainder of the work rests are formed by movable and lockable rams of jacks which cooperate with the fixed work rests to hold the work thereon against distortion when subjected to a machining operation or operations, thereby greatly facilitating the installation and coordination of the work rests and assuredly obtaining optimum uniformity in their engagement with the work in non-distorted condition, regardless of the number of jacks and regardless of possible variations in the profiles of the engaging work surfaces.

Another object of the present invention is to provide a chuck of this type with a minimum number of clamps if their clamping pressure is required or desirable for drawing any particular work against the aforementioned sealing means before exhausting the vacuum space, thereby also increasing the overall force with which the work is held in the chuck against displacement while being subjected to a machining operation.

A further object of the present invention is to provide a chuck of this type in which all of the aforementioned jacks are hydraulically operated and individually lockable, and receive operating liquid from a common source under a pressure which, while adequate to drive their movable rams into engagement with work in the chuck, is clearly inadequate to drive these rams with such force as to dislocate the work and break the seal of the vacuum space, or distort the work, even if the rams should engage the work while the same is at first drawn only lightly against the rests by a low vacuum in the space.

It is another object of the present invention to provide a chuck of this type in which the aforementioned hydraulic jacks are individually locked by providing a valve which may be operated either to provide simultaneous communication between the common liquid source and all jacks, or to intercept such communication as well as intercommunication between the jacks, thereby achieving simultaneous and individual locking and unlocking of each jack on simple manipulation of the valve.

Another object of the present invention is to provide a chuck of this type in which operating liquid from the supply is, in the open position of the aforementioned valve, forced into the jacks by a pump which is operated by the partial vacuum created in the aforementioned vacuum space on each placement of work against the rests, thereby achieving automatic engagement of the jack rams with the located work in the chuck with a combined force which at any instant is smaller than the overall force with which the work is held in the chuck by the partial vacuum in the space alone and, hence, is assuredly insufficient ever to dislodge the work from the chuck or even distort the same where engaged by the rams.

A further object of the present invention is to provide a chuck of this type in which the aforementioned pump is in the form of a cylinder and piston therein of which one side of the cylinder holds operating liquid and communicates with all jacks through the aforementioned valve when open, and the other side is vented to the atmosphere, while the piston is at the fluid side of the cylinder operatively connected with a vacuum-responsive driver which is in permanent communication with the vacuum space and will, on subjection to a partial vacuum in the latter, force the piston to displace liquid from the cylinder into the jacks for moving the rams thereof into engagement with the work in the chuck.

It is another object of the present invention to provide a chuck of this type in which the aforementioned vacuum-responsive driver for the piston in the pump cylinder is a plunger in another cylinder of which one side of the latter is in permanent communication with the vacuum space and the other side is vented to the atmosphere, while the effective cross-sectional area of the plunger is, in comparison to the area of the work surface exposed to the partial vacuum in the space, such as to achieve movement of the rams of the jacks into engagement with the work in the chuck without ever dislodging the work from the latter or even distorting it, as aforementioned.

It is a further object of the present invention to provide a chuck of this type in which the aforementioned pump, valve and jacks, together with the requisite communication conduits, constitute a sealed hydraulic system carried entirely by the chuck and, hence, being rotatable therewith, and having suitable bleeding provisions for the removal of any entrapped air therein, thereby greatly facilitating the sealing of the hydraulic system and reducing to a minimum the possibility of leakage therefrom even after long use of the chuck at high operating speeds, and also permitting a condensed construction of the hydraulic system with a minimum supply of operating liquid.

Another object of the present invention is to provide a chuck of this type in which spring means may react either with the rams of all jacks or with either of the aforementioned piston or plunger in order to achieve automatic retraction of all the rams from their work-rest position when finished work is removed from the chuck, thereby causing all jacks normally to move with each work change for most reliable repeat performances of the same and affording immediate visual discernment by the operator of any ram that should for any reason become stuck.

It is a further object of the present invention to provide a chuck of this type in which a vacuum pump may continuously exhaust a booster chamber, and a suitable valve may be operated into open and closed positions in which to provide communication between this booster chamber and the aforementioned vacuum space, and intercept such communication and simultaneously vent the latter, respectively, thereby to achieve, on opening the valve and holding work in properly located position in the chuck, instantaneous exhaust of part of the air from the vacuum space into the booster chamber and, hence, an instantaneous common sub-atmospheric pressure in both the vacuum space and booster chamber which assuredly will immediately hold the work securely in the chuck, and to achieve also, on closing the valve, instantaneous venting of the vacuum space and, hence, release of the finished work from the chuck, while the vacuum pump continues to exhaust the booster chamber for the following quick and secure grip of new work as soon as the same is placed in the chuck and the valve reopened.

Further objects and advantages will appear to those skilled in the art from the following, considered in conjunction with the accompanying drawings.

In the accompanying drawings, in which certain modes of carrying out the present invention are shown for illustrative purposes:

Fig. 1 is a side view of a chuck embodying the present invention;

Fig. 4 is an enlarged fragmentary section through the chuck showing certain valve mechanism thereof;

Fig. 5 is another enlarged fragmentary section through the chuck showing certain jack mechanism thereof;

Fig. 6 is an enlarged cross-section through the valve mechanism in Fig. 4, taken on the line 6—6 thereof;

Fig. 7 is another enlarged fragmentary section through the chuck, showing certain pump mechanism thereof;

Fig. 8 is another enlarged fragmentary section through the chuck, showing certain work-holding provisions thereof;

Fig. 9 is still another enlarged fragmentary section through the chuck, showing a certain seal thereof;

Fig. 10 is an enlarged fragmentary section through a chuck with a pump mechanism which is modified from that shown in Fig. 7;

Fig. 13 is a section taken on the line 13—13 of Fig. 12; and

Figure 2:
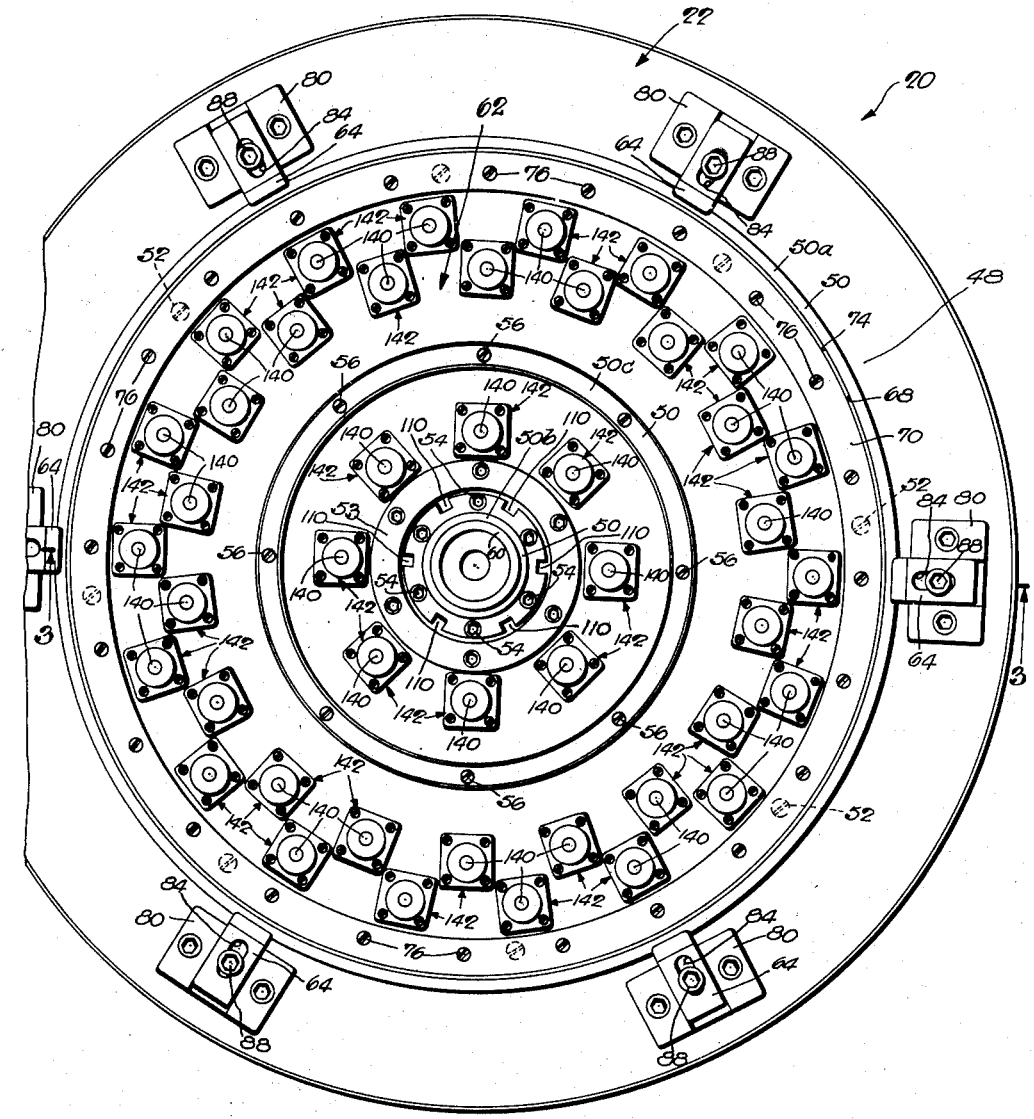
Fig. 2 is a front view of the same chuck.
Figure 3:
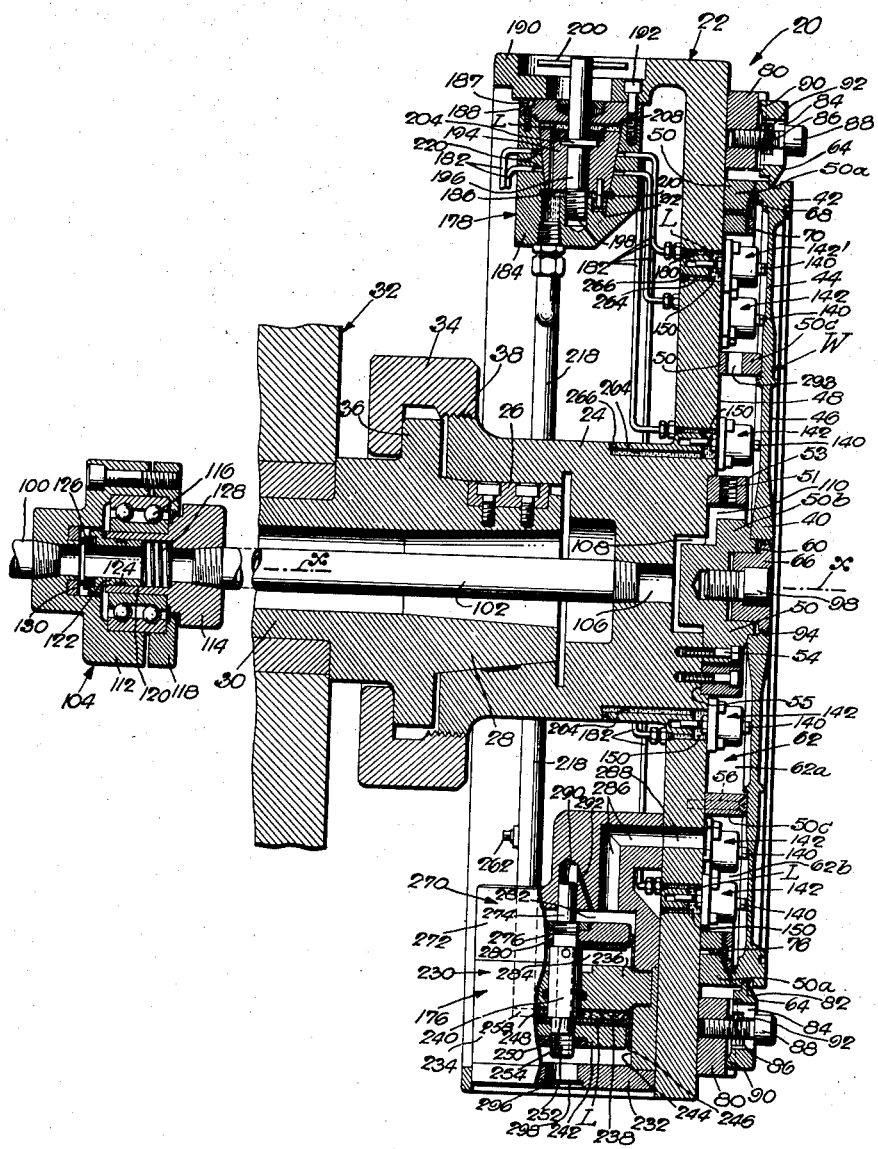
Fig. 3 is a section through the chuck as taken on the lines 3—3 of Fig. 2.

Referring to the drawings, and more particularly to Figs. 1 to 3 thereof, the reference numeral 20 designates a chuck having a body 22 the hub 24 of which is splined at 26 to a tapered head 28 of a power spindle 30 of a lathe or other machine tool 32. The hub 24 of the chuck body 22 is firmly drawn against the tapered spindle head 28 by a nut 34 which bears against a shoulder 36 on the spindle 30 and is threadedly received at 38 by the hub 24.

The instant chuck 20 is adapted to hold work of the aforementioned special kind which is either permanently distorted or non-distorted, and is in any event readily distortable and, hence, cannot be held for safe and accurate machining by conventional chuck jaws. As an example of the special work which may safely and accurately be machined in the instant chuck, there is shown in Fig. 3 a workpiece W in the form of a slightly distorted or non-distorted wheel having a relatively rigid central hub 40 and outer rim 42 and a more or less readily distortable or bendable web 44 of varying cross-sectional shape. After accurately machining or profiling the outer face 46, for instance, of the exemplary work W, the latter may be subjected to other operations, and buckets may eventually be mounted on its periphery so that the work in its finished form may constitute a turbine wheel for a jet engine, for instance. In order to permit accurate machining of the work W and maintain its wall-thickness at any radial distance from its hub 40 uniform throughout, it is imperative that the distortable work, whether permanently distorted in part or in toto or non-distorted, must in the first instance be held in the chuck in non-distorted condition in the absence of any local tool pressure thereon, and must furthermore remain non-distorted even when tool or other pressure is locally exerted anywhere on its face 46.

In order to hold the work W in non-distorted condition in the chuck in the absence of any tool pressure thereon, there are provided on the front face 48 of the chuck body 22 forwardly projecting work rests or stops 50, in this instance three, namely an outer rest 50a, an inner rest 50b and an intermediate rest 50c. The work rests 50a, 50b and 50c are in this instance arranged concentrically with respect to the rotary axis X of the chuck, and are secured to the chuck body 22 by bolts 52, 54 and 56, respectively (Figs. 2 and 3). In the present instance, the work W is placed with its rim 42 and hub 40 against the outer and inner rests 50a and 50b, respectively, and with its web 44 against the intermediate rest 50c. The rests 50 are so arranged and coordinated that the work W, whether slightly permanently distorted or not, will in any event be compelled to assume or remain in non-distorted condition when uniformly engaging these work rests. Thus, assuming that the web 44, for instance, of the exemplary work W be slightly permanently distorted out of the median plane of the latter, the entire work W, including its permanently distorted web 44, will be compelled to assume a non-distorted condition when uniformly engaging the work rests 50 (Fig. 3). The work W may in this instance be accurately located on all work rests 50 by registering a machined aperture 58 in its hub 40 with a cylindrical forward projection 60 on the inner work rest 50b (Figs. 3 and 8). In order securely to hold the rest 50b in proper work-locating position, the same is centered by set screws 51 in a ring 53 in an annular recess 55 in the front face 48 of the chuck body 22 (Fig. 8), whereupon the bolts 54 are tightened.

In accordance with the present invention, subatmospheric pressure is relied on to hold the properly located work W in the chuck in uniform engagement with the rests 50 so that the work will assume or remain in non-distorted condition, as aforementioned. To this end, the ring-shaped space 62 between the located work W on the rests 50 and the front face 48 of the chuck body 22, confined in this instance between the outer and inner work rests 50a and 50b (Figs. 2 and 3), is appropriately sealed from the atmosphere and air is exhausted therefrom, all as described more fully hereinafter, so that the pressure differential between the sub-atmospheric and atmospheric pressures on the opposite sides or faces of the work will securely hold the latter against the rests 50.

The space 62, hereinbefore referred to as "vacuum" space, is normally open at the front, and is closed by the work W when the same is located on the rests 50 as shown in Fig. 3. The sealing of the vacuum space 62 is also accomplished by the work W when the latter is, in the present instance, forced with its rim 42 and hub 40 against the outer and inner rests 50a and 50b by clamps 64 and 66, respectively. The outer work rest 50a is preferably provided with a sealing ring 68 of suitable compressible material which is engaged by the rim of the work when forced against the rest 50a by the clamps 64. The sealing ring 68 which may be held by a ring 70 in a dished recess 72 in the outer work rest 50a (Fig. 9), has an outer circumferential margin 74 which extends beyond the rest 50a in order to be compressible by the engaging rim of the work for reliably sealing the vacuum chamber 62 thereat, even if the rim of the work should be slightly distorted and sufficiently rigid to bear at best unevenly against the rest 50a despite the application of the spaced clamps 64. The ring 70 may be secured to the outer work rest 50a in any suitable manner, as by a plurality of screws 76, for instance. The exemplary ring-shaped vacuum space 62 may at the inner rest 50b be sealed reliably through forced engagement therewith of the hub 40 of the work under the compulsion of the clamp 66, though a sealing ring may, if desired, be also provided on the inner work rest 50b as indicated at 78 in Fig. 8.

The outer clamps 64 are carried by grooved blocks 80 on the chuck body 22 for movement radially into and from a peripheral groove 82 in the rim 42 of the exemplary work W, and also transversely into and from clamping engagement with the work when projecting into the peripheral groove 82 therein. To this end, each clamp 64 is provided with an elongated slot 84 through which extends the shank 86 of a clamping screw 88 which is threadedly received in the associated block 80, while the tail end 90 of the clamp serves as a fulcrum for the latter for its movement into and from clamping engagement with the work (Fig. 3). Preferably, a compression-type spring 92 is interposed between each clamp 64 and its respective block 80 to urge the former from clamping engagement with the work on loosening the associated clamping screw 88. The inner clamp 66, which is of necessity removable to permit the placement of the exemplary work W in and its removal from the chuck, has a collar 94 (Fig. 8) which is forced against an internal shoulder 96 in the apertured hub 40 of the work by a clamping screw 98 which is threadedly received by the inner work rest 50b. Thus, the outer clamps 64 as well as the inner clamp 66 engage the exemplary work W so as to leave the entire outer face 46 thereof exposed for a machining operation or operations.

Air is exhausted from the vacuum space 62 by any suitable vacuum pump (not shown) which communicates with the former through successive conduits 100 and 102 with a swivel connector 104 therebetween, and successive passages 106, 108 and 110 in the chuck body 22 and inner work rest 50b, respectively (Fig. 3). The passage 108 is in the form of an annular recess in the chuck body 22 which is in communication with the passages 110 that are formed by peripheral and continuing radial grooves in the inner work rest 50b (see also Figs. 2 and 8). The conduit 102, which extends through the hollow power spindle 30 of the lathe or other machine tool 32 that carries the instant chuck, is turnable with the latter, while the conduit 100 from the vacuum pump is not turnable, requiring therefore the interposition between these conduits of the aforementioned swivel connector 104. This swivel connector 104 comprises complemental sections 112 and 114 with which the conduits 100 and 102, respectively, are connected. Interposed between the connector sections 112 and 114 is an anti-friction bearing 116 by means of which the rotary section 114 is journalled in the fixed section 112. A bolted ring 118 on the connector section 112 serves as a retainer for the bearing 116. The rotary connector section 114 has an integral sleeve portion 120 with which a sleeve 122 telescopes. A sealing ring 124 is interposed between the sleeve 122 and the sleeve portion 120 of the connector section 114 to prevent leakage of air therebetween. Further, a sealing ring 126 in one end of the sleeve 122 is thrust by a spring 128 against a ring 130 in the connector section 112 with sufficient force to prevent leakage of air thereat into the sleeve 122.

Interposed in the conduit 100 may be any suitable valve (not shown) operable into open and closed positions to provide communication between the aforementioned vacuum pump and the vacuum space 62, and to intercept such communication and vent the latter to the atmosphere, respectively. The same valve or any other suitable control may be arranged to connect the intake side of the vacuum pump with the atmosphere when the same is continuously operating and while disconnected from the vacuum space 62, though the operation of the vacuum pump may be controlled in various different ways. For example, a conventional vacuum pump, with the usual automatic cut-out provisions at a certain minimum sub-atmospheric pressure at its intake side, may operate continuously, subject only to its automatic cut-out, and advantageously exhaust a booster chamber of comparatively large volume which through the aforementioned valve may be connected with or disconnected from the vacuum space 62. In that case, sub-atmospheric pressure will normally always prevail in the booster chamber, thereby achieving, on each opening of the valve and holding work in properly located position in the chuck, instantaneous partial exhaust of air from the vacuum space into the booster chamber and, hence, an instantaneous common sub-atmospheric pressure in both, the vacuum space and booster chamber, which assuredly will immediately hold the work securely in the chuck, and further achieving, on closing the valve, instantaneous venting of the vacuum space and, hence, release of finished work from the chuck while the vacuum pump continues to exhaust the booster chamber for the following quick and secure grip of new work as soon as the same is placed in the chuck and the valve reopened.

While the aforementioned work rests 50 function to hold the work W non-distorted in the absence of any tool pressure thereagainst, they fail to hold the work against distortion when subjected to local tool pressure most anywhere except directly over the work rests 50. Thus, even if the exemplary work W is held firmly against the rests 50 (Fig. 3), its web 44 would readily give way or buckle uncontrollably if subjected to local tool pressure anywhere between the work rests 50. To prevent this, additional "work rests" are provided in the form of rams 140 of jacks 142 on the chuck body 22. The jacks 142 are in any event so arranged that their rams engage those portions of the work, hereinafter referred to as "critical" work portions, which despite the firm hold of the work on the rests 50 would give or buckle when subjected to tool pressure. Accordingly, a considerable number of these jacks 142 are judiciously arranged in the vacuum space 62 between the fixed work rests 50a, 50b and 50c (Figs. 2 and 3) in order to prevent buckling of the critical portions of the exemplary work W when subjected to local tool pressure anywhere on its exposed face 46.

The jacks 142 are, in the present instance, of an hydraulic type, and all may be identical, wherefore a detailed description of one of them, namely the jack 142' in Figs. 3 and 5, will suffice. Thus, the jack 142' comprises a body or casing 144 providing one side 146 of a cylinder chamber 148 the other side 150 of which is provided in the chuck body 22. The ram 140 is guided for axial movement in a bore 152 in the casing 144, and is additionally guided with its axial shank 154 in a recess 156 in the chuck body 22. The ram 140 is further provided with a plunger-like collar 158 to which is attached a centrally apertured portion of a sealing ring or membrane 160 of flexible material, such as rubber or any other suitable rubber-like material, for instance, while an outer marginal portion of this membrane extends between and is secured to the casing 144 and the chuck body 22, so that an intermediate portion 162 of this membrane and the collar 158 on the ram separate the opposite sides 146 and 150 of the cylinder chamber 148 and seal them from each other. The centrally apertured portion of the sealing membrane 160 may conveniently be clamped to the collar 158 of the ram 140 by a disc 164 and a nut 166 on a threaded length of the shank 154 on the ram, while the outer marginal portion of the membrane may conveniently be clamped between the chuck body 22 and the casing 144 by the bolts 168. The collar 158 on the ram 140 is equally spaced throughout from the wall 170 of the cylinder chamber, and relatively loosely folded on itself in this space is at least a part of the intermediate portion 162 of the membrane 160. Accordingly, it is this intermediate folded portion 162 of the membrane which will further fold or partially unfold on movement of the ram 140 into and from engagement, respectively, with the work W. A compression spring 172 in the casing 144 normally urges the ram 140 out of engagement with the work W. To avoid marking of the work W by the engaging ram 140 on application of tool pressure on the outer face 46 of the work, the ram carries a cap 174 of any material suitable for this purpose, such as hard rubber or neoprene, for instance.

The sides 150 of the cylinder chamber 148 of all jacks, which hold liquid L for the operation of the respective rams and are hereinafter referred to as "liquid chambers," are connected with a liquid pump 176 through intermediation of valve mechanism 178 (Fig. 3). Thus, each liquid chamber 150 has a passage 180 in the chuck body 22 which through a conduit 182 is connected with the valve mechanism 178.

The valve mechanism 178 (Figs. 3 and 4) comprises a casing 184 having an open chamber 186 which is closed by a cover 188 bolted to the casing as at 187. The valve casing 184 is removably mounted on the skirt 190 of the chuck body 22 by bolts 192. Received in the chamber 186 is a valve 194 which in the present instance is of frusto-conical shape. The valve 194 is carried by an operating spindle 196 which is threadedly received with its end 198 in the casing 184 and is provided at its other end with a readily accessible handle 200. The valve 194 is, on manipulation of the spindle 196 in opposite directions, axially movable with the latter into and from seating engagement with the frusto-conical wall 202 of the chamber 186 in the valve casing.

To this end, a collar 204 on the spindle 196 is retained in an annular recess 206 in the valve 194 by a nut 208 in the latter. Appreciable rotation of the valve 194 in the valve casing 184 is prevented by a pin 210 on the former which projects into a recess 212 in the casing 184. A sealing ring 214 in the cover 188 is forced by a nut 216 into sealing engagement with the spindle 196 to prevent the escape of operating liquid L from the valve chamber 186 past this spindle. The valve chamber 186 receives operating liquid from the aforementioned pump 176 through a conduit 218. It will be noted from Figs. 3, 4 and 6 that the valve casing 184 is provided with peripherally spaced passages 220 which in this instance are arranged in two axially spaced series and are equal in total number to the number of jacks 142. Each of these passages 220 is connected with a jack 142 through the respective conduit 182, so that the liquid chamber 150 of each jack is, significantly, in communication with the valve chamber 186 independently of any other jack. Accordingly, when the valve 194 is closed, i. e. when it is in seating engagement with the frusto-conical surface 202 of the valve chamber 186, intercommunication between the liquid chambers 150 of the jacks via the valve chamber 186, as well as communication between the pump 176 and all jacks via the same valve chamber, are intercepted. Conversely, communication between the pump 176 and the jacks 142 and also intercommunication between the latter are provided when the valve 194 is opened.

The liquid pump 176 (Figs. 3 and 7) comprises an open casing 230 which is closed by a removable cover 232. The casing 230, which is suitably mounted on the chuck body 22, is formed in this instance by a peripheral section 234 and an end section 236 which define a cylinder or pump chamber 238. Axially slidable in the end section 236 of the casing 230 is the rod 240 of a piston 242 in the pump chamber 238. The seal between the piston 242 and the wall 244 of the pump chamber 238 is formed by a flexible membrane 246 which is arranged similarly as any one of the membranes 160 in the jacks 142. Thus, a centrally apertured portion of the membrane 246 is firmly clamped between the piston 242 and a disc 248 by means of a nut 250 on the shank 252 of the piston rod 240 which holds the piston 242, the disc 248 and the portion of the membrane 246 therebetween in firm engagement with an annular shoulder 254 on the piston rod, while a continuous peripheral margin of the same membrane is appropriately clamped between the casing sections 234 and 236. An intermediate portion 256 of the membrane 246 is at least in part relatively loosely folded on itself in the space between the piston 242 and the wall 244 of the pump chamber 238. It is this loosely folded intermediate portion of the membrane which will further fold or partially unfold on movement of the piston 242 in opposite directions, as will be readily understood. The pump casing 230 is provided with a passage 258 which provides communication between the pump chamber 238 and the conduit 218 that leads to the chamber 186 in the valve casing 184. Accordingly, liquid L is displaced from the pump chamber 238 into the chambers 150 of the various jacks 142 for forcing the rams 140 of the latter into engagement with the work W, when the piston 242 is moved to the left as viewed in Fig. 7 while the valve 194 is open (Fig. 4). Conversely, on movement of the piston 242 in the opposite direction, i. e. to the right as viewed in Fig. 7, the return springs 172 in the various jacks 142 will be permitted to force the rams 140 from engagement with the work W and cause displacement of liquid from the jack chambers 150 and into the pump chamber 238 while the valve 194 is open.

The chambers 150 of all jacks 142, the valve chamber 186 and the pump chamber 238, together with the conduits 182 and 218, form a closed hydraulic system which may be filled, for instance, through an inlet in the conduit 218 which may normally be plugged as at 262 (Fig. 3). In order to permit the escape of entrapped air from the system, the liquid chamber 150 of each jack 142 is, in the present instance, provided with a bleeder passage 264 which is normally sealed by a plug 266. It is, of course, fully within the purview of this invention to fill the hydraulic system at any other desired place, and also provide the entire system with a single bleeder passage and eliminate the necessity of providing each jack with a bleeder passage by slightly modifying the ports therein in self-evident fashion.

The pump 176 is, in the present instance, operated automatically to force the rams 140 of the jacks 142 into, and permit their spring-return from, engagement with the work when the latter is secured in the chuck and removed therefrom, respectively. This is accomplished by relying on the sub-atmospheric pressure in the aforementioned vacuum space 62 by means of which the work W is uniformly held in engagement with the rests 50 in non-distorted condition. To this end, another cylinder 270 is formed by another casing section 272 and the aforementioned end section 236 of the pump casing 230 (Figs. 3 and 7). Carried by a shank 274 of the piston rod 240 is another piston 276 which is sealed from the wall 278 of the cylinder 270 by a flexible membrane 280 arranged similarly as the membrane 246 in the pump casing 230. The piston 276 and membrane 280 divide the cylinder 270 into chambers 282 and 284 of which the chamber 282, hereinafter called "vacuum" chamber, communicates with the vacuum space 62 through successive passages 286 and 288 in the casing section 272 and chuck body 22, respectively (Figs. 3 and 7). The shank 274 of the piston rod 240 is in this instance axially guided in a recess 290 in the casing section 272 (Fig. 7), and this recess 290 is connected through a duct 292 with the vacuum chamber 282 so as to have no dashpot action on the piston rod 240.

In operation, the work W is located on the work rests 50 by passing its apertured hub 40 over the cylindrical projection 60 on the inner work rest 50b, whereupon the outer clamps 64 and the inner clamp 66 are applied to the work in a manner described hereinbefore. At this time, the aforementioned valve of the vacuum system, hereinafter referred to as "vacuum" valve, may be opened in order to achieve, by the action of the aforementioned vacuum pump, partial exhaust of the air from the now sealed vacuum space 62 to an extent sufficient to assure that the subatmospheric pressure in the latter will draw and securely hold the work in uniform engagement with the rests 50, and in this instance especially with the intermediate rest 50c where no external clamp or clamps are applied to the work. In order that air may be exhausted equally from the entire vacuum space 62, the intermediate work rest 50c is provided with preferably several apertures 293 (Fig. 3) which provide communication between the sections 62a and 62b of the sealed vacuum space 62 into which the latter is divided by the intermediate work rest 50c.

Immediately on exhausting air from the vacuum space 62, the partial vacuum thus created therein will extend to the vacuum chamber 282 in the cylinder 270 and tend to draw the piston 276 to the left as viewed in Fig. 7, the opposite chamber 284 of the cylinder 270 being devoid of any dashpot action on the piston 276 by being vented to the atmosphere through a duct 294 in the piston rod 240 and a passage 296 in the casing 230 which is preferably provided with a protective screen 298. However, the partial vacuum in the chamber 282 cannot move the piston 276 until the valve 194 is opened (Fig. 4) to unlock the pump 176 and permit displacement of liquid from the latter through the valve mechanism 178 and into the jacks 142. Accordingly, the valve 194 may next be opened in order that the partial vacuum in the chamber 282 may draw the piston 276 and, hence, also the other piston 242 on the same piston rod 240 to the left as viewed in Fig. 7 to displace operating liquid from the pump chamber 238 through the valve mechanism 178 and into all the jacks 142 and urge the rams 140 into engagement with the work W against the force of their return springs 172. After the rams 140 are in engagement with the work W at the critical portions thereof, the valve 194 is closed (Fig. 3) in order to intercept communication between the jacks 142 and the pump 176 and also intercommunication between all jacks. The ram 140 of each jack 142 thus becomes locked, by the trapped operating liquid in its chamber 150, as firmly as if it were fixed in axial position, and will never give way under local tool or other pressure of any magnitude on the outer face 46 of the work W. The work W is now securely held in the chuck in non-distorted condition and may be subjected to any machining or other operation or operations without undergoing temporary or permanent distortion while in the chuck. After the work W is finished, the same is removed from the chuck. This may be accomplished by first opening the valve 194 to unlock the jacks 142 and the pump 176, and then opening the aforementioned vacuum valve to vent the vacuum space 62 to the atmosphere as described, whereupon the clamps 64 and 66 may be released from the work and the clamp 66 removed from the chuck for the removal of the work from the latter. In following this procedure, the return springs 172 in the jacks 142 will force the rams 140 from engagement with the work W as soon as the combined force of these springs exceeds the diminishing force with which the increasing air pressure (sub-atmospheric) in the vacuum chamber 282 holds the piston 276 against movement to the right as viewed in Fig. 7, meaning that the rams 140 will in any event disengage from the work W before full atmospheric pressure is restored in the vacuum space 62. After removing the work W from the chuck, an operating cycle of the latter is concluded, and the same cycle may be repeated with another workpiece in the chuck, by again following the above-described procedure in the same order or in a modified order mentioned hereinafter.

In order that the rams 140 of the jacks 142 may, on their engagement with the clamped work W, never distort the critical portions of the latter, it is imperative that their respective specific pressures (per unit area) against these critical work portions will never exceed the specific force (per unit area) with which the sub-atmospheric pressure in the vacuum space 62 holds the work in uniform or full engagement with the work rests 50. This is readily accomplished by making the effective cross-sectional area of the piston 276 in the vacuum chamber 282 in any event smaller, and preferably considerably smaller, than the area of the work W on the rests 50 which is exposed to the partial vacuum in the vacuum space 62, i. e. the entire area of the work within the confines of the vacuum space 62 and engaged neither by the work rests 50 nor by the rams 140 of the jacks 142.

It is, of course, fully within the purview of this invention to omit the return springs 172 in the jacks 142 altogether. In that case, the movable elements of the hydraulic system will simply remain static on removal of work from the chuck, meaning that there will be no force to return the rams 140 of the jacks 142 from their present work-engaging positions. However, new work placed in the chuck will depress that ram or those rams which necessarily have to yield in order that the work may uniformly engage all work rests 50. That such forced displacement of a ram or rams by new work placed in the chuck will distort the critical work portions even temporarily is highly unlikely, for such ram displacement would be resisted only by the negligible friction of the involved movable elements of the hydraulic system. After clamping the new work in place and holding it in uniform engagement with the work rests 50 by sub-atmospheric pressure in the vacuum space 62, the pump 176 will automatically operate to force all rams 140 into engagement with the work, as will be readily understood. Nevertheless, the provision of the return springs 172 in the jacks 142 as shown, by compelling all the rams 140 to retract from their work-engaging positions every time finished work is removed from the chuck, will secure the advantage that no ram will be given any opportunity to become stuck or bound in any position due to inaction, and an operator will immediately discern any ram that should for any reason whatever become stuck in a projected position.

While in the hereinbefore described operation of the chuck the valve 194 was reopened, for the operation of the jack rams 140 into engagement with the work, after the vacuum valve was reopened to establish sub-atmospheric pressure in the vacuum space 62 for achieving uniform engagement of the work with the work rests 50, the valve 194 may even be left open from the previous operating cycle of the chuck when the vacuum valve is reopened for the same purpose, without any possibility that the rams 140 will engage the work before the same is held in firm uniform engagement with the work rests 50 by sub-atmospheric pressure in the vacuum space 62. This is due to the fact that the operation of the liquid pump 176 is in the first instance responsive to sub-atmospheric pressure in the vacuum chamber 62, and its liquid-displacing action from the pump chamber 238 will in any event lag, due to friction losses in the movable parts of the hydraulic system, behind the establishment of sufficient sub-atmospheric pressure in the vacuum space 62 to hold the work securely on the rests 50, so that the specific pressures of the individual rams 140 against the work in the chuck will at no time exceed the specific force with which the sub-atmospheric pressure in the vacuum space holds the work in uniform engagement with the work rests 50, as hereinbefore explained.

While the exemplary chuck shown employs the clamps 64 and 66, in addition to sub-atmospheric pressure in the vacuum space 62 and the backing action of the rams of the jacks, in order securely to hold the work in the chuck against distortion when being operated upon, it is conceivable to omit these clamps and rely solely on sub-atmospheric pressure in the vacuum space and the backing action of the rams of the jacks for securely holding in the chuck certain types of work in non-distorted condition for certain machining or other operations.

Many of the important advantages of the instant chuck have already been explained herein, and others will be explained presently. Thus, by providing the chuck with fixed work rests of a minimum number sufficient to compel distortable work thereon to assume or remain in non-distorted condition in the absence of external tool pressure thereon, and having all other "work rests," which cooperate with the fixed work rests in holding the work against distortion when subjected to a machining operation or operations, in the form of lockable rams of jacks, the installation and coordination of all "work rests" for any particular work is greatly facilitated, and optimum uniformity in their engagement with the work in non-distorted condition is assured regardless of the overall number of "work rests" and regardless of possible variations in the profiles of the engaging work surfaces. Also, while individual control valves may be provided for each jack in order to provide communication between the latter and the liquid pump 176, the provision of a single control valve, namely the valve mechanism 178, is highly advantageous from the standpoint of simplicity of construction of the hydraulic system of the chuck and its efficient operation. Furthermore, and as already explained in part, by operating the liquid pump by means of the partial vacuum in the vacuum space on each placement of work against the fixed work rests, there is achieved automatic engagement of the rams of all jacks with the work in the chuck with a combined force which at any instant is smaller than the overall force with which the work is held in the chuck by the partial vacuum in the vacuum space alone and, hence, is assuredly insufficient ever to dislodge the work from the chuck or even distort the same when engaged by the rams. Also, by forming the jacks, valve mechanism and liquid pump, together with the communicating conduits, as a closed hydraulic system and arranging the same in toto on the chuck, the entire system is rotatable with the latter, the sealing of the system is greatly facilitated and the possibility of leakage therefrom even after long use of the chuck at high operating speeds is reduced to a minimum, and the system may be of condensed construction requiring a minimum amount of operating liquid. Further, by the use of the aforementioned membranes in the jacks, there are obtained in an exceedingly simple manner long-lasting and wear-resistant seals between the rams and the liquid chambers in the jacks which do not require overly accurate fitting of the parts of the latter, and these seals are, moreover, practically frictionless and, hence, permit reliable operation of an even exceptionally large number of jacks by the aforementioned vacuum-operated pump with a quickly attainable moderate partial vacuum and despite condensed construction of the hydraulic system.

While in the chuck described hereinbefore the liquid pump 176 is automatically operated by sub-atmospheric pressure in the vacuum space 62 (Fig. 3), this liquid pump may, for many highly practical chuck applications, be operated manually where low costs is a prime consideration or sensitive manual control over the force exerted by the rams of the jacks on the work is desirable, or for other reasons. Fig. 10 shows an example of a liquid pump 176' which is manually operable, and to this end is provided with a threaded stud 300 having at one end a driver 302 and being formed at its other end with a hexagonal head 304 for manipulation with a wrench or other suitable tool. The stud 300 is received, in this instance, in a hardened bushing 306 which is mounted by screws 308 in the section 310 of a pump casing 312 the complemental section 314 of which is bolted at 316 to the section 310 and forms with the latter a pump chamber 318 in which a piston 320 is received. The piston 320 is carried by a rod 322 which is axially movable in a bore 324 in the casing section 310 and splined thereto as at 326. The piston rod 322 is further guided for axial movement by having its shank 328 slidably received in a recess 330 in the casing section 314. In order that the recess 330 may not have a dashpot effect on the piston rod, the former communicates with the pump chamber 318 through a duct 332 in the casing section 314. The piston 320 is preferably sealed from the wall 334 of the pump chamber 318 by a flexible membrane 336 which may be arranged similarly as the membrane 246 in the earlier described pump 176 in Fig. 7. Leading from the pump chamber 318 is a passage 338 with which may be connected the conduit 218 of the earlier described chuck 20 (Fig. 3). In order to displace operating liquid L from the pump chamber 318 into the jacks, after first opening the described liquid valve, the stud 300 is, by a suitable wrench, manipulated so that its driver 302 will force the rod 322 and piston 320 thereon to the left as viewed in Fig. 10. After engagement of the rams of the jacks with work in the chuck with a force that is readily determined by the operator, the liquid valve is closed in order to lock the jacks for a machining operation or operations on the work. After the operation or operations on the work are concluded, the liquid valve is reopened to permit retraction of the jack rams from the work under the compulsion of their return springs (Fig. 5) and displacement of operating liquid from the jacks into the pump chamber 318, as the stud 300 is manipulated in the opposite direction to permit return of the rod 322 and piston 320 thereon into, or short of, the position shown in Fig. 10.

The manually operable pump 176' embodies, in the present instance, also a return spring 340 which is interposed between the casing section 314 and piston 320 and normally urges the latter into its home position in which the rams of the jacks are retracted from work in the chuck. In view of the closed and sealed condition of the hydraulic system, and with the provision of the return spring 340 in the pump chamber 318, it is entirely feasible to eliminate the return springs in the jacks if the single return spring 340 has sufficient force to overcome the friction encountered by the moving elements of the hydraulic system in displacing operating liquid from the jacks into the pump chamber 318 for the retraction of the rams of the jacks from the work, and if the return strokes of these rams are such that all of the latter are forced against stops at the ends of their return strokes while the piston 320 returns to its home position. Thus, in order that the single return spring 340 may assuredly bring about retraction of the rams of all jacks from the work, the return motion of the piston 320 into the home position in Fig. 10, or into a home position short of that in Fig. 10, must cause the displacement from the jacks of sufficient operating liquid to compel all rams to return into engagement with the bottom surfaces of their respective liquid chambers as shown in Fig. 5, so that no single ram may possibly remain in work-engaging position.

Figure 11:
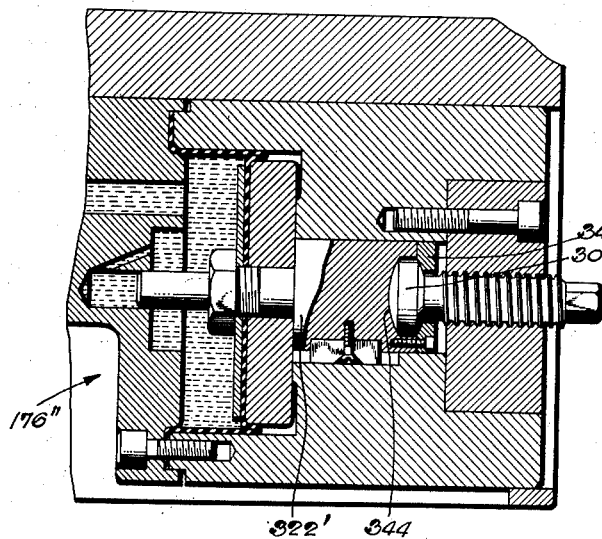
Fig. 11 is an enlarged fragmentary section through a chuck with another pump mechanism which is modified from those shown in Figs. 7 and 10.

Fig. 11 shows a liquid pump 176" which is in all respects like the pump 176' in Fig. 10, except that the same is also manually operated for the return motion of the rams of the jacks out of engagement with the work, and thereby permits the elimination of any and all return spring provisions in the hydraulic system. To this end, the driver 302' has a swivel connection with the piston rod 322' by being held in a socket 344 in the latter by a retainer plate 346.

Figure 12:
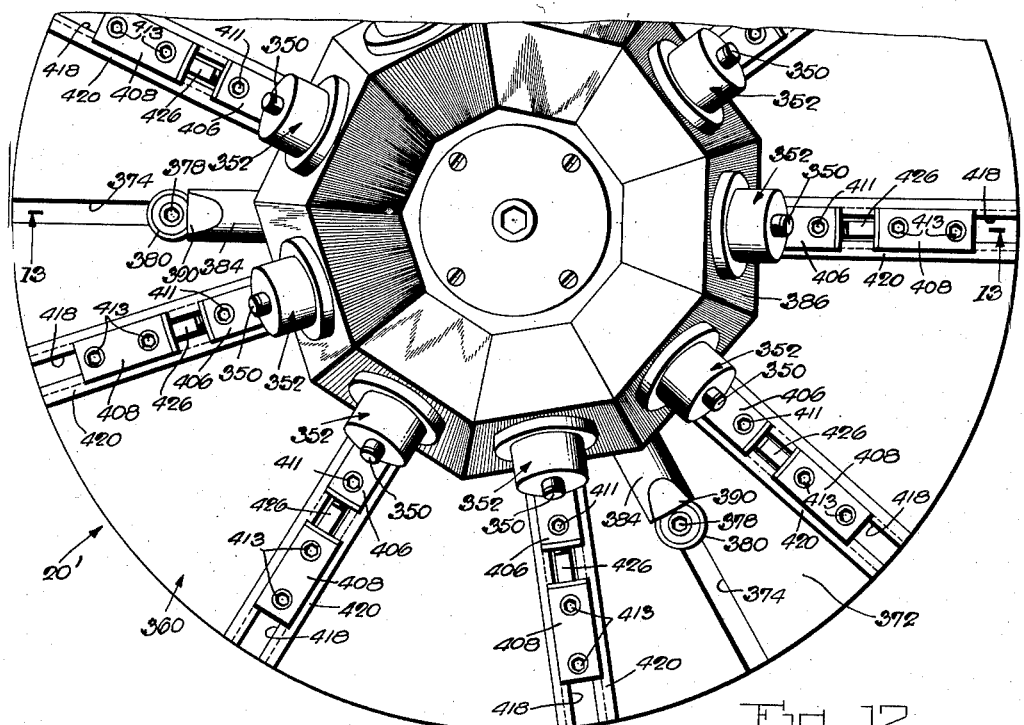
Fig. 12 is a fragmentary front view of a chuck embodying the present invention in a modified manner.

While in the hereinbefore described chuck 20 hydraulic jacks are used to great advantage in backing flat or substantially flat work so that the same will not distort or buckle when being operated on, the hydraulic jacks may be used with equal advantage in backing critical portions of tubular work against distortion or buckling when being operated on, regardless of whether or not a partial vacuum is used to hold the work against a work rest or rests. Thus, Figs. 12 and 13 show a chuck 20' in which the rams 350 of hydraulic jacks 352 are used to back a critical, i. e. readily distortable or breakable, skirt 354 of exemplary tubular work W', a base flange 356 of which is, in the present instance, held in the chuck without benefit of a partial vacuum, while a top flange 358 of the work may require machining. The instant chuck 20' has a body 360 which may be splined at 362 to the frusto-conical head 364 of a power spindle 366 of a lathe or other machine tool 368. A nut 370 may serve firmly to hold the chuck body 360 on the head of the power spindle 366. Provided in the front face 372 of the chuck body 360 are angularly spaced radial guideways 374 in which slides 376 are received (Fig. 13). Secured by a screw 378 to each slide 376 is a work rest or stop 380 against which is placed the base flange 356 of the exemplary work W'. On adjusting the slides 376 in their respective guideways 374 so that the work rests 380 thereon may accommodate the exemplary work W', the screws 378 are tightened in order to lock the slides 376 in the guideways 374.

The work W' is, in the present instance, centered in the chuck by centering bars 384 which are radially movable in a mandrel 386 that may conveniently be bolted at 388 to the chuck body 360. The centering bars 384 have outer flattened ends 390 with which to engage the inner surface of the base flange 356 of the work and thus hold the latter in accurately centered position in the chuck. The inner ends of the centering bars 384 are in this instance T-shaped as at 392 and are received with a sliding fit in longitudinally inclined guideways 394 in an actuator plunger 396 in an annular recess 398 in the mandrel 386. A plurality of compression springs 400 serve to urge the plunger 396 outwardly so as to force the centering bars 384 into engagement with the work. To cause retraction of the centering bars 384 for the placement of new work in the chuck, there is provided an operating screw 402 which is threadedly received by the mandrel 368 and has a collar 404 for engagement with the plunger 396 and depression of the same against the force of the springs 400 when the screw 402 is turned in the appropriate direction. On turning the operating screw 402 in the opposite direction, the same moves outwardly, and the plunger 396 will, under the compulsion of the springs 400, axially follow the operating screw until the centering bars 384 uniformly engage the work.

The exemplary work W' is held in the chuck by pairs of cooperating inner and outer jaws 406 and 408, respectively, which are keyed at 410 and 412, and also bolted at 411 and 413, to carriers 414 and 416, respectively. These carriers are slidable in radial ways 418 in guide blocks 420 which are mounted on the chuck body 360 by means of bolts 422 and dowel pins 424 (Fig. 13). A headed spindle 426 operatively connects each pair of jaw carriers 414 and 416 for bringing the associated inner and outer jaws 406 and 408 into and from clamping engagement with the centered or located work on the rests 380.

The hydraulic jacks 352 are in this instance arranged on the mandrel 386 peripherally thereof, and the liquid chamber 428 of each jack is connected through continuing ducts 430 and 432 in the mandrel 386 and chuck body 360 with a conduit 434 that leads to the valve mechanism 178' which may in all respects be like the valve mechanism 178 of the earlier described chuck 20 (Fig. 4). Suitable means (not shown) may be provided to bleed trapped air from the liquid chamber 428 of each jack. The valve chamber in the valve mechanism 178' may communicate through a conduit 218' with a manually operable liquid pump 436 which may, for instance, be in all respects like the described pump 176' in Fig. 10 or the described pump 176" in Fig. 11.

The operation of the instant chuck is self-evident. Thus, after placing the work W' against the rests 380, then centering it with the bars 384 and finally holding the same firmly in place with the inner and outer jaws 406 and 408, the valve mechanism 178' may be opened by means of the handle 438 thereof, whereupon the pump 436 is operated to cause advance of the rams 350 of the jacks 352 into engagement with the critical skirt 354 of the work W'. The valve mechanism 178' is thereupon closed in order to lock the ram of each jack individually. The work may now be subjected to a machining or any other operation or operations. After the work is finished, the same may be removed from the chuck in a manner which is so obvious as to require no further comment.

Figure 14:
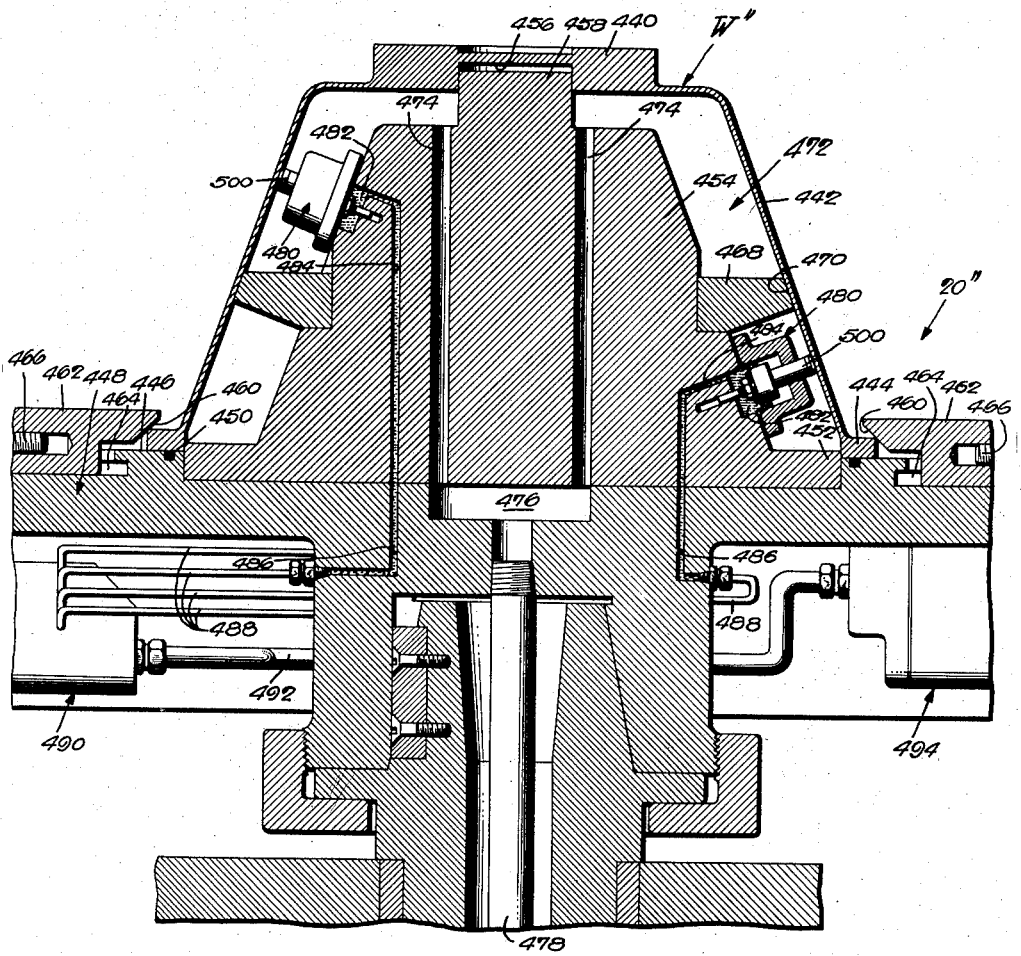
Fig. 14 is a longitudinal section through a chuck embodying the present invention in a further modified manner.

While the chuck 20' just described does not use a partial vacuum for holding tubular work, the further modified chuck 20" in Fig. 14 relies on a partial vacuum and a fixed work rest or rests, in addition to the rams of hydraulic jacks, in order to hold tubular work nondistorted while being subjected to a machining operation or operations. The exemplary tubular work W" held in the instant chuck 20" may be generally cup-shaped, having a bottom 440 to be machined, for instance, and a relatively weak and distorted or non-distorted, but in any event readily distortable, peripheral wall 442 with its more rigid rim 444 adapted for mounting in the chuck. Thus, the annular rim 444 of the exemplary work W" is placed against the front face 446 of the chuck body 448, preferably over a sealing ring 450 therein, and is centered in the chuck on the cylindrical base 452 of a mandrel 454 on the chuck body 448. The bottom 440 of the work W" is accurately located in the chuck by having a machined recess 456 which is brought into registry with a cylindrical pilot 458 on the mandrel 454. The rim 444 of the work may firmly be held in located position by the inclined faces 460 of a plurality of angularly spaced jaws 462 which are movable in radial guideways 464 in the chuck body 448 and forced against the work by any suitable means, such as operating screws 466, for instance.

Located on the mandrel 454 is a work rest 468 which is in this instance circular, and has an endless peripheral rest surface 470 for the critical sidewall or skirt 442 of the work W".

Sub-atmospheric pressure in the "vacuum" space 472 between the mandrel 454 and the work W" is relied on to force the critical skirt 442 of the work into uniform engagement with the work rest 468 and thereby hold it non-distorted in the absence of any local tool or other external pressure on the work. To this end, air from the vacuum space 472 is exhausted through passages 474 and 476 in the mandrel 454 and chuck body 448, and through a conduit 478 which, through a suitable valve, may be connected directly with the intake side of a vacuum pump or with an exhausted booster chamber. As the sub-atmospheric pressure in the vacuum space 472 draws the skirt 442 of the work W" into firm and uniform engagement with the work rest 468, the bottom 440 of the work may reorient itself, but will remain accurately located on the pilot 458, for any reorientation of the bottom 440 of the work will be permitted by the pilot 458 in a direction axially of the latter only.

The hydraulic jacks 480 are in this instance arranged in two spaced peripheral rows on opposite sides of the work rest 468. The liquid chambers 482 of these jacks communicate through ducts 484 and 486 in the mandrel 454 and chuck body 448, respectively, with conduits 488 which lead to the valve mechanism 490 that may in every respect be like the valve mechanism 178 of the described chuck 20 (Fig. 4). A conduit 492 connects the valve chamber of the valve mechanism 490 with a liquid pump 494 which may be like either one of the manually operable pumps 176' or 176" of Figs. 10 and 11, respectively. Suitable bleeding means (not shown) may be provided for each of the jacks 480.

The operation of the chuck 20" is as follows. Work W" is placed over the mandrel 454 and against the front face 446 of the chuck body 448, and is simultaneously centered on the cylindrical base 452 and pilot 458 on the mandrel 454, whereupon the jaws 462 may be forced into firm clamping engagement with the work. The vacuum valve may next be opened for the partial exhaust of the air from the vacuum space 472 in order to force the skirt 442 of the work into firm and uniform engagement with the work rest 468, whereupon the pump 494 may, after first opening the valve mechanism 490, be operated to cause movement of the rams 500 of the jacks 480 into engagement with the skirt 442 of the work. Thereafter, the valve mechanism 490 is closed in order to lock the rams 500 of the individual jacks. The work W" is now ready to be operated upon. After the work is finished, the same may be removed from the chuck by opening the valve mechanism 490 and causing retraction of the jack rams from the work, operating the vacuum valve to vent the vacuum space 472 to the atmosphere, and retracting the jaws 462 from clamping engagement with the work.

While the chucks 20' and 20" described herein hold tubular work for an external machining operation or operations, it is of course, fully within the purview of the present invention to apply their underlying principles in the construction of chucks which hold tubular work for an internal machining operation or operations.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A chuck for holding distortable work, comprising a body; spaced projecting rests on said body at the front thereof and arranged to hold properly located and fully engaging work thereon non-distorted with a space between the latter and said body; sealing means on said body at the front thereof arranged to seal said space from the atmosphere when engaged by work on said rests; means including a passage in said body for exhausting air from said space to hold work against said rests; an hydraulic jack on said body having a ram movable in said space into and from engagement with work on said rests; and valve means operable to provide and intercept communication between a supply of operating liquid and said jack.

2. A chuck for holding distortable work as set forth in claim 1, in which said valve means is a single valve carried by said body outside said chamber.

3. A chuck for holding distortable work, comprising a body; spaced projecting rests on said body at the front thereof and arranged to hold properly located and fully engaging work thereon non-distorted with a space between the latter and said body; sealing means on said body at the front thereof arranged to seal said space from the atmosphere when engaged by work on said rests; means including a passage in said body for exhausting air from said space to hold work against said rests; an hydraulic jack on said body having a ram movable in said space into and from engagement with work on said rests; a liquid pump; and valve means operable to provide and intercept communication between said pump and jack, and said pump being operated by sub-atmospheric pressure in said space to force liquid into said jack.

4. A chuck for holding distortable work as set forth in claim 3, in which said pump and valve means are carried by said body, and said jacks, pump and valve means form a sealed hydraulic system having filling and bleeding means.

5. A chuck for holding distortable work as set forth in claim 3, in which said valve means is a single valve outside said space.

6. A chuck for holding distortable work, comprising a body; spaced projecting rests on said body at the front thereof and arranged to hold properly located and fully engaging work thereon non-distorted with a space between the latter and said body; sealing means on said body at the front thereof arranged to seal said space from the atmosphere when engaged by work on said rests; means including a passage in said body for exhausting air from said space to hold work against said rests; an hydraulic jack on said body having a ram part movable in said space into and from engagement with work on said rests; a liquid pump having a movable plunger part; valve means operable into first and second positions in which to provide and intercept communication, respectively, between said pump and jack, said jack, pump and valve means forming a sealed hydraulic system having filling and bleeding means; and a device operable to move said plunger part in a direction to displace liquid from said pump into said jack when said valve means is in said first position, and also releasably to lock said plunger part in any position against movement in the opposite direction.

7. A chuck for holding distortable work as set forth in claim 6, further comprising return spring means acting on one of said parts and moving the same in a direction to cause displacement of liquid from said jack into said pump when said valve means is in said first position and said plunger part is released for movement in said opposite direction.

8. A chuck for holding distortable work as set forth in claim 6, in which said device is also operative to move said plunger part in said opposite direction to cause displacement of liquid from said jack into said pump when said valve means is in said first position.

9. A chuck for holding distortable work as set forth in claim 6, further comprising a return spring acting on said plunger and moving the same in said opposite direction to draw liquid from said jacks into said pump when said valve means is in said first position and said plunger is released for movement in said opposite direction.

10. A chuck for holding distortable work, comprising a body; spaced projecting rests on said body at the front thereof and arranged to hold properly located and fully engaging work thereon non-distorted with a space between the latter and said body; sealing means on said body at the front thereof arranged to seal said space from the atmosphere when engaged by work on said rests; means including a passage in said body for exhausting air from said space to hold work against said rests; spaced hydraulic jacks on said body having rams movable in said space into and from engagement with work on said rests; a liquid pump having a movable plunger; valve means operable into first and second positions in which to provide communication between said pump and jacks, and to intercept such communication and also intercommunication between said jacks, respectively, said plunger being subjected to and moved by sub-atmospheric pressure in said space to displace liquid from said pump into said jacks when said valve means is in said first position, and said jacks, pump and valve means forming a sealed hydraulic system having filling and bleeding means; and return springs acting on said rams and retracting them from work on said rests when the pressure in said space approaches atmospheric pressure and said valve means is in said first position.

11. A chuck for holding tubular distortable work, comprising a body including a forwardly projecting mandrel portion; spaced outwardly projecting work rests on said mandrel portion arranged to hold properly located and fully resting work thereon non-distorted with a space between the latter and said mandrel portion; sealing means arranged on said body to seal said space from the atmosphere when engaged by work on said rests; means including a passage in said body for exhausting air from said space to hold work against said rests; and jack mechanism on said mandrel portion having ram means movable in said space into and from engagement with work on said rests and being lockable in any position.

12. A chuck for holding distortable work, comprising a body; means on said body for locating thereon work with one side thereof exposed for an operation thereon; means on said body operable to engage a part of located work on said body and clamp it to the latter; spaced hydraulic jacks on said body having rams movable into and from engagement with the other side of another part of clamped work on said body; a pump having a cylinder chamber and a piston therein movable in first and second directions to displace liquid from and admit it into said chamber, respectively; means to move said piston in said first direction; and valve means operable into first and second positions in which to provide communication between said pump chamber and jacks, and to intercept such communication and also intercommunication between said jacks, respectively, and said jacks, pump and valve means forming a sealed hydraulic system having filling and bleeding means.

13. A chuck for holding distortable work comprising a body; spaced rests on said body at the front thereof arranged to properly locate work thereon with space between the latter and said body; means for holding work immobile relative to said body against said rests; spaced hydraulic jacks on said body having rams movable in said space into and from engagement with work on the rests; and means including a supply of operating liquid connected with said jacks for moving said rams towards engagement with the work.

14. A chuck for holding distortable work comprising a body; spaced rests on said body at the front thereof arranged to properly locate work thereon with space between the latter and said body; means for holding work immobile relative to said body against said rests; spaced hydraulic jacks on said body having rams movable in said space into and from engagement with work on the rests; a liquid pump carried on said body; and conduit means connecting said pump and said jacks for supplying liquid under pressure to said jacks for moving said rams towards engagement with the work.

15. A chuck for holding work having thin distortable areas, comprising a body; spaced rests on said body at the front thereof arranged to properly locate work thereon with space between the distortable areas of the latter and the front of said body; means for holding work immobile relative to said body against said rests; a plurality of hydraulic jacks on said body grouped opposite the distortable areas on the work and having rams including tips of restricted area for contacting each a local portion of the distortable area of the work, said rams being movable in said space into and from engagement with parts of said distortable areas of work on the rests; and means including a supply of operating fluid connected with said jacks for moving said rams towards and into engagement with work under controlled pressure, and for locking said rams in work supporting position when properly engaged.

References Cited in the file of this patent

UNITED STATES PATENTS

| | | |
|---|---|---|
| 283,367 | Barclay | Aug. 21, 1883 |
| 1,041,028 | Church | Oct. 15, 1912 |
| 1,875,486 | Peaslee | Sept. 6, 1932 |